United States Patent
Harrison, Jr. et al.

(10) Patent No.: US 12,371,243 B2
(45) Date of Patent: Jul. 29, 2025

(54) INSULATED CONTAINER

(71) Applicant: Igloo Products Corp., Katy, TX (US)

(72) Inventors: Vernon A. Harrison, Jr., Sealy, TX (US); John Maldonado, Katy, TX (US); James McKenrick, Katy, TX (US); Ninh Pham, Katy, TX (US)

(73) Assignee: Igloo Products Corp., Katy, TX (US)

( * ) Notice: Subject to any disclaimer, the term of this patent is extended or adjusted under 35 U.S.C. 154(b) by 419 days.

(21) Appl. No.: 17/668,767

(22) Filed: Feb. 10, 2022

(65) Prior Publication Data
US 2023/0166901 A1     Jun. 1, 2023

Related U.S. Application Data

(63) Continuation of application No. 29/817,465, filed on Dec. 1, 2021, now abandoned.

(51) Int. Cl.
| | |
|---|---|
| *B65D 81/38* | (2006.01) |
| *B62B 1/10* | (2006.01) |
| *B62B 5/06* | (2006.01) |
| *B65D 25/32* | (2006.01) |
| *B65D 43/16* | (2006.01) |
| *B65D 51/24* | (2006.01) |

(52) U.S. Cl.
CPC ............ *B65D 81/3813* (2013.01); *B62B 1/10* (2013.01); *B62B 5/067* (2013.01); *B65D 25/32* (2013.01); *B65D 43/163* (2013.01); *B65D 51/24* (2013.01)

(58) Field of Classification Search
CPC .... B65D 81/3813; B65D 81/00; B65D 81/38; B65D 81/3818; B65D 25/32; B65D 25/28; B65D 43/163; B65D 43/14; B65D 43/16; B65D 51/24; B62B 1/10; B62B 1/125; B62B 1/12; B62B 1/24; B62B 5/067; B62B 5/06; B62B 2301/05; B62B 2301/00; B62B 2204/06; B62B 2204/00; A45C 5/14; A45C 11/20; A45C 13/262; A45C 13/26; A45C 2013/267
See application file for complete search history.

(56) References Cited

U.S. PATENT DOCUMENTS

| | | |
|---|---|---|
| 4,213,310 A | 7/1980 | Buss |
| D257,934 S | 1/1981 | Buss |
| D267,444 S | 1/1983 | Ruxton |
| D268,979 S | 1/1983 | Ruxton |

(Continued)

FOREIGN PATENT DOCUMENTS

| | | |
|---|---|---|
| AU | 2707277 | 1/1979 |
| AU | 83403 | 9/1981 |

(Continued)

OTHER PUBLICATIONS

Notice of Allowability issued in U.S. Appl. No. 29/817,465 mailed on Oct. 10, 2023.

(Continued)

*Primary Examiner* — James M Dolak
(74) *Attorney, Agent, or Firm* — Dinsmore & Shohl LLP (57) ABSTRACT

Present embodiments relate to a container, such as an insulated container, or cooler. More specifically, but without limitation, the present embodiments relate to a container with a telescoping handle, a bailing handle, and a roller wheel assembly for multiple transport options.

16 Claims, 8 Drawing Sheets

(56) References Cited

U.S. PATENT DOCUMENTS

| | | | |
|---|---|---|---|
| D269,398 S | 6/1983 | Ruxton | |
| D289,597 S | 5/1987 | Averitt | |
| 4,667,484 A | 5/1987 | Tarozzi et al. | |
| D292,056 S | 9/1987 | Decker | |
| 4,696,412 A | 9/1987 | McGowan | |
| 4,724,681 A * | 2/1988 | Bartholomew | F25D 3/06 |
| | | | D34/25 |
| D307,998 S | 5/1990 | Costello et al. | |
| D323,950 S | 2/1992 | Pleet | |
| 5,313,817 A * | 5/1994 | Meinders | B62B 1/24 |
| | | | 280/43.1 |
| 5,319,937 A | 6/1994 | Fritsch | |
| D349,007 S | 7/1994 | Costello | |
| D352,420 S | 11/1994 | Costello | |
| D369,695 S | 5/1996 | Imotani | |
| 5,630,488 A * | 5/1997 | Chen | A45C 13/262 |
| | | | 16/113.1 |
| 5,683,097 A | 11/1997 | Fenton et al. | |
| D400,053 S | 10/1998 | Coffee | |
| 5,860,281 A * | 1/1999 | Coffee | H10N 10/00 |
| | | | 312/317.3 |
| 6,047,976 A * | 4/2000 | Wang | A45C 11/20 |
| | | | 280/37 |
| 6,176,499 B1 * | 1/2001 | Conrado | A45C 11/20 |
| | | | 280/63 |
| 6,328,179 B1 * | 12/2001 | Conrado | F25D 3/06 |
| | | | 220/592.2 |
| D464,534 S | 10/2002 | McCully et al. | |
| D486,357 S | 2/2004 | Leba | |
| 6,755,428 B2 * | 6/2004 | Butler | B62B 1/206 |
| | | | 224/547 |
| D497,517 S | 10/2004 | Reuter | |
| D500,057 S | 12/2004 | Reuter | |
| 7,051,550 B2 | 5/2006 | Roth | |
| D527,226 S | 8/2006 | Maldonado | |
| D528,368 S | 9/2006 | Maldonado | |
| D529,344 S | 10/2006 | Maldonado | |
| 7,140,507 B2 | 11/2006 | Maldonado | |
| D534,771 S | 1/2007 | Zorn | |
| 7,306,243 B2 * | 12/2007 | Van Horn | A45C 13/262 |
| | | | 280/30 |
| 7,344,028 B2 | 3/2008 | Hanson | |
| 8,181,811 B1 * | 5/2012 | Blake | A45B 23/00 |
| | | | 248/156 |
| 9,366,467 B2 | 6/2016 | Kiedaisch | |
| 9,462,796 B1 | 10/2016 | Ellis et al. | |
| 9,476,638 B1 * | 10/2016 | Tyler | A45C 5/14 |
| 9,616,562 B2 * | 4/2017 | Hoppe | A45C 7/0086 |
| D792,486 S | 7/2017 | Li | |
| D802,028 S | 11/2017 | Li | |
| D802,029 S | 11/2017 | Li | |
| D802,630 S | 11/2017 | Li | |
| D820,049 S | 6/2018 | Ahlstrom | |
| 10,151,520 B2 * | 12/2018 | Christensen | B62B 1/16 |
| D836,993 S | 1/2019 | Meda | |
| D836,994 S | 1/2019 | Meda | |
| D844,386 S | 4/2019 | Ahlstrom | |
| 10,272,934 B2 * | 4/2019 | DeFrancia | B62B 1/12 |
| D887,788 S | 6/2020 | Meda | |
| D888,503 S | 6/2020 | Meda | |
| D894,043 S | 8/2020 | Meda | |
| D901,986 S | 11/2020 | Meda | |
| D904,830 S | 12/2020 | Meda | |
| D905,129 S | 12/2020 | Deng | |
| D907,074 S | 1/2021 | Yang | |
| D920,743 S | 6/2021 | Meda | |
| D921,439 S | 6/2021 | Meda | |
| D922,148 S | 6/2021 | Yang et al. | |
| 11,027,885 B2 | 6/2021 | Duong | |
| D927,938 S | 8/2021 | Meda | |
| D929,471 S | 8/2021 | Meda | |
| D933,449 S | 10/2021 | Ahlström | |
| D935,280 S | 11/2021 | Thelin | |
| D953,814 S | 6/2022 | Thelin | |
| D954,764 S | 6/2022 | Meda | |
| 11,359,848 B2 | 6/2022 | Guan | |
| 11,884,456 B2 * | 1/2024 | Whitmire | B25H 3/022 |
| 12,049,344 B2 * | 7/2024 | Duong | B65D 51/24 |
| 12,066,245 B2 * | 8/2024 | Jacob | A45F 3/04 |
| 12,084,100 B2 * | 9/2024 | Wang | B62B 5/067 |
| 12,140,364 B2 * | 11/2024 | Bischof | F25D 23/028 |
| 12,246,905 B2 * | 3/2025 | Nelson | B65D 43/163 |
| 2004/0089582 A1 | 5/2004 | Hendrix, Jr. | |
| 2004/0178208 A1 * | 9/2004 | Leba | F25D 3/08 |
| | | | 220/761 |
| 2005/0127081 A1 | 6/2005 | Minh | |
| 2005/0263432 A1 | 12/2005 | Hanson | |
| 2005/0263527 A1 | 12/2005 | Maldonado | |
| 2005/0263528 A1 | 12/2005 | Maldonado | |
| 2005/0279123 A1 | 12/2005 | Maldonado | |
| 2005/0279124 A1 | 12/2005 | Maldonado | |
| 2007/0023439 A1 | 2/2007 | Vaughn | |
| 2008/0001373 A1 | 1/2008 | Vaughn | |
| 2008/0006629 A1 | 1/2008 | Roth | |
| 2008/0025544 A1 | 1/2008 | Maldonado | |
| 2011/0182532 A1 | 7/2011 | Baltus | |
| 2011/0197625 A1 * | 8/2011 | Urban | B62B 5/067 |
| | | | 62/457.1 |
| 2011/0226003 A1 | 9/2011 | Chaney et al. | |
| 2013/0340467 A1 | 12/2013 | Kiedaisch | |
| 2015/0338159 A1 | 11/2015 | Watson et al. | |
| 2016/0150862 A1 * | 6/2016 | Tonelli | A45C 13/262 |
| | | | 190/115 |
| 2016/0245576 A1 * | 8/2016 | Harral | A45C 11/20 |
| 2017/0023290 A1 | 1/2017 | DeMuth | |
| 2018/0015938 A1 | 1/2018 | Defrancia | |
| 2018/0141718 A1 | 5/2018 | Ahlstrom | |
| 2018/0149400 A1 | 5/2018 | Valencia | |
| 2019/0161240 A1 | 5/2019 | Ahlstrom | |
| 2020/0062454 A1 | 2/2020 | Duong | |
| 2020/0140165 A1 | 5/2020 | Maldonado | |
| 2020/0216229 A1 | 7/2020 | Weixian | |
| 2020/0217571 A1 | 7/2020 | Weixian | |
| 2020/0217574 A1 | 7/2020 | Thelin | |
| 2020/0217575 A1 | 7/2020 | Thelin | |
| 2020/0217576 A1 | 7/2020 | Weixian | |
| 2020/0217578 A1 | 7/2020 | Wang | |
| 2021/0018250 A1 | 1/2021 | Tang et al. | |
| 2021/0070523 A1 | 3/2021 | Iyer | |
| 2021/0070528 A1 | 3/2021 | Iyer | |
| 2021/0071930 A1 | 3/2021 | Iyer | |
| 2021/0123656 A1 | 4/2021 | Barros | |
| 2021/0127808 A1 | 5/2021 | Thelin | |
| 2021/0214123 A1 | 7/2021 | Iyer | |
| 2021/0229893 A1 | 7/2021 | Maldonado | |
| 2021/0253305 A1 | 8/2021 | Duong | |
| 2021/0285710 A1 | 9/2021 | Barros | |
| 2022/0114847 A1 | 4/2022 | Emde | |
| 2022/0114853 A1 | 4/2022 | Emde | |
| 2022/0119152 A1 | 4/2022 | Blankinship | |
| 2022/0228406 A1 | 7/2022 | Barros | |
| 2023/0166901 A1 | 6/2023 | Harrison, Jr. et al. | |

FOREIGN PATENT DOCUMENTS

| | | |
|---|---|---|
| AU | 83402 | 4/1982 |
| AU | 93721 | 10/1986 |
| AU | 2005262599 | 1/2006 |
| AU | 2011215734 | 8/2012 |
| AU | 201712770 | 5/2017 |
| AU | 201712777 | 5/2017 |
| AU | 201712780 | 5/2017 |
| AU | 201712782 | 5/2017 |
| AU | 201712791 | 5/2017 |
| AU | 201712799 | 5/2017 |
| AU | 201712802 | 5/2017 |
| AU | 201712803 | 5/2017 |
| AU | 201712785 | 7/2017 |
| AU | 201716789 | 11/2017 |
| AU | 201716791 | 11/2017 |
| AU | 201717667 | 1/2018 |
| AU | 201717669 | 1/2018 |
| AU | 201717670 | 1/2018 |

(56) References Cited

FOREIGN PATENT DOCUMENTS

| | | |
|---|---|---|
| AU | 201717674 | 1/2018 |
| AU | 201717676 | 1/2018 |
| AU | 201717662 | 2/2018 |
| AU | 201816061 | 1/2019 |
| AU | 201910011 | 2/2019 |
| AU | 201913598 | 8/2019 |
| AU | 201913601 | 8/2019 |
| AU | 201913603 | 8/2019 |
| AU | 201913604 | 8/2019 |
| AU | 201913607 | 8/2019 |
| AU | 201913624 | 8/2019 |
| AU | 201913626 | 8/2019 |
| AU | 201913627 | 8/2019 |
| AU | 201913631 | 8/2019 |
| AU | 201913633 | 8/2019 |
| AU | 202012545 | 6/2020 |
| AU | 202012548 | 6/2020 |
| AU | 2019284128 | 7/2020 |
| AU | 2019284129 | 7/2020 |
| AU | 2019284130 | 7/2020 |
| AU | 2019284131 | 7/2020 |
| AU | 2019284133 | 7/2020 |
| AU | 2019284134 | 7/2020 |
| AU | 2019302329 | 1/2021 |
| AU | 2019325454 | 1/2021 |
| AU | 2019376154 | 3/2021 |
| AU | 2019371335 | 5/2021 |
| CA | 48429 | 7/1981 |
| CA | 48762 | 10/1981 |
| CA | 53100 | 7/1984 |
| CA | 1281859 | 3/1991 |
| CA | 2229259 | 8/1998 |
| CA | 2460597 | 9/2004 |
| CA | 2570413 | 1/2006 |
| CA | 2789507 | 8/2011 |
| CA | 179459 | 12/2018 |
| CA | 179460 | 12/2018 |
| CA | 3105713 | 1/2020 |
| CA | 3106550 | 2/2020 |
| CA | 3117297 | 5/2020 |
| CA | 214387 | 7/2022 |
| CN | 101370699 | 2/2009 |
| CN | 101431913 | 5/2009 |
| CN | 106233083 | 7/2019 |
| CN | 110191654 | 8/2019 |
| CN | 305553099 | 1/2020 |
| CN | 305751278 | 5/2020 |
| CN | 306079204 | 9/2020 |
| CN | 112424547 | 2/2021 |
| CN | 112585416 | 3/2021 |
| CN | 112955703 | 6/2021 |
| CN | 112996411 | 6/2021 |
| DE | 20007242 U1 | 8/2000 |
| DE | 20110247 | 12/2002 |
| DE | 202004010081 | 9/2004 |
| DE | 202007001638 | 5/2007 |
| DE | 202009015164 | 3/2010 |
| DE | 202013007655 | 1/2015 |
| DE | 102019200065 | 1/2019 |
| DE | 102019200067 | 1/2019 |
| DE | 102019200068 | 1/2019 |
| DE | 102019200070 | 1/2019 |
| DE | 112017005901 | 8/2019 |
| DE | 102019200063 | 7/2020 |
| DE | 102019200064 | 7/2020 |
| EP | 1765109 | 3/2007 |
| EP | 2534026 | 12/2012 |
| EP | 3821186 | 5/2021 |
| EP | 3841338 | 6/2021 |
| EP | 3874211 | 9/2021 |
| EP | 3876785 | 9/2021 |
| ES | 1030365 | 8/1995 |
| ES | 1030365 Y | 7/1996 |
| JP | 11006677 | 1/1999 |
| KR | 1020040080384 | 9/2004 |
| KR | 1020210040356 | 4/2021 |
| KR | 1020210048496 | 5/2021 |
| KR | 1020210084483 | 7/2021 |
| MX | PA04001493 | 12/2004 |
| MX | PA06014878 | 10/2007 |
| WO | 2005123539 | 12/2005 |
| WO | 2006007266 | 1/2006 |
| WO | 2006009537 | 1/2006 |
| WO | 2007016092 | 2/2007 |
| WO | 2008013973 | 1/2008 |
| WO | 2011094355 | 8/2011 |
| WO | 2011100522 | 8/2011 |
| WO | 2015066559 A2 | 5/2015 |
| WO | 2018095957 | 5/2018 |
| WO | 2020013913 | 1/2020 |
| WO | 2020041236 | 2/2020 |
| WO | 2020091849 | 5/2020 |
| WO | 2021050253 | 3/2021 |
| WO | 2021050255 | 3/2021 |
| WO | 2021050298 | 3/2021 |
| WO | 2021086620 | 5/2021 |
| WO | 2021145971 | 7/2021 |
| WO | 2021154394 | 8/2021 |
| WO | 2022081513 | 4/2022 |

OTHER PUBLICATIONS

U.S. Appl. No. 29/817,465 titled "Cooler" filed on Dec. 1, 2021.
Office Action issued in CN Design Application No. 202230328533.8 mailed on Jul. 5, 2023.
Australia Design Application No. 202213003 titled "Cooler" filed on May 24, 2022.
Australia Design Application No. 202213004 titled "Cooler" filed on May 24, 2022.
EU Design Application No. 009030604-001 titled "Cooler" filed on May 18, 2022.
EU Design Application No. 009030604-002 titled "Cooler" filed on May 18, 2022.
EU Design Application No. 009030604-003 titled "Cooler" filed on May 18, 2022.
GB Design Application No. 6209118 titled "Cooler" filed on May 19, 2022.
GB Design Application No. 6209119 titled "Cooler" filed on May 19, 2022.
GB Design Application No. 6209120 titled "Cooler" filed on May 19, 2022.
CN Design Application No. 202230328533.8 titled "Cooler" filed on May 31, 2022.
International Search Report and Written Opinion issued in PCT Application No. PCT/US2022/031282 mailed on Sep. 13, 2022.
Notice of Allowability issued in U.S. Appl. No. 29/817,465 mailed on Jul. 21, 2023.
Notice to Grant issued in CN Application No. 202230328533.8 mailed on Dec. 6, 2023.
Design U.S. Appl. No. 29/708,155 filed Oct. 3, 2019 titled Latch.
Design U.S. Appl. No. 29/708,156 filed Oct. 3, 2019 titled Latch.
Dometic Product Catalog—Coolers; 2015.
Dometic Product Catalog—Coolers; 2016.
Design U.S. Appl. No. 29/820,716, filed Dec. 23, 2021 titled Container.
Design U.S. Appl. No. 29/820,717, filed Dec. 23, 2021 titled Container.
Design U.S. Appl. No. 29/817,465, filed Dec. 1, 2021 titled Cooler.
U.S. Appl. No. 17/720,019, filed Apr. 13, 2022 titled Packable Cooler Bag.
PCT Application No. PCT/IB2022/056075 filed Jun. 29, 2022 titled Soft-Sided Cooler.
U.S. Appl. No. 63/353,281, filed Jun. 17, 2022 titled Insulated Container.
PCT Application No. PCT/US2022/031282 filed May 27, 2022 titled Insulated Container.
U.S. Appl. No. 17/825,374, filed May 26, 2022 titled Mobile Cooling Box with Ice Maker.

(56) References Cited

OTHER PUBLICATIONS

Design U.S. Appl. No. 29/840,161, filed May 26, 2022 titled Cooler Fender Frame.
U.S. Appl. No. 17/872,514, filed Jul. 25, 2022 titled Mobile Cooling Box with Hinge Module.
U.S. Appl. No. 17/874,162, filed Jul. 26, 2022 titles Thermal Insulation Bag.
PCT Application No. PCT/US2022/026932 filed Apr. 29, 2022 titled Accessory Grid Apparatus for a Cooler.
U.S. Appl. No. 17/875,693, filed Jul. 28, 2022 titled Containment System Including a Soft Container.
Design U.S. Appl. No. 29/836,642, filed Apr. 28, 2022 titled Half Sleeve Ice Block.
Design U.S. Appl. No. 29/823,704, filed Jan. 19, 2022 titled Insulated Box.
MX Application No. MX/f/2022/002028 filed Jul. 19, 2022 titled Insulated Box.
EU App. No. 009092620 filed Jul. 19, 2022 titled Insulated Box.
U.S. Appl. No. 17/874,701, filed Jul. 27, 2022 titled Locking Module for a Container.
PCT Application No. PCT/US2022/038492 filed Jul. 27, 2022 titled Locking Module for a Container.
U.S. Appl. No. 17/887,106, filed Aug. 12, 2022 titled Cooler.
U.S. Appl. No. 17/886,803, filed Aug. 12, 2022 titled Mobile Cooling Box with Handle Module.
The International Bureau of WIPO; International Preliminary Report on Patentability issued in PCT/US2022/031282 mailed May 2, 2024, 8 pages.

* cited by examiner

INSULATED CONTAINER

CLAIM TO PRIORITY

This non-provisional patent application claims priority to and benefit of, under 35 U.S.C. § 120, U.S. Design Patent Application 29/817,465, titled "Cooler", filed Dec. 1, 2021, all of which is expressly incorporated herein by reference.

BACKGROUND

1. Field of the Invention

Present embodiments relate to a container, such as an insulated container, or cooler, among other types. More specifically, but without limitation, the present embodiments relate to a container with a telescoping handle and bailing handle for multiple transport, or portability, options.

2. Description of the Related Art

Containers used for storage of food or beverages, may be portable. It would be desirable to ease the manner in which such containers are transported. For example, most containers must be carried, and therefore more heavier containers sometimes require two people for to carry. It would be desirable to provide a container which allows transport by a single person but when fully loaded such single person transport is difficult. It would also be desirable to provide a cooler which allows for transport by the single person in multiple ways. Still further, it would also be desirable to provide such options in a manner which still allows for storage in small areas, dependent upon container size, such as below a stadium seat or in bleacher areas.

The information included in this Background section of the specification, including any references cited herein and any description or discussion thereof, is included for technical reference purposes only and is not to be regarded as subject matter by which the scope of the invention is to be bound.

SUMMARY

The present application discloses one or more of the features recited in the appended claims and/or the following features which alone or in any combination, may comprise patentable subject matter.

The present embodiments provide a container, such as an insulated container or cooler which allows for transport by a single person and which also allows for movement by the single person even if fully loaded and of a higher weight. The container may be moved in two manners, by carrying or by rolling movement and comprises handles appropriate for each manner of transport and movement.

According to some embodiments an insulating container comprises a body having a lower support having a periphery, a plurality of upstanding walls extending from the periphery of the lower support, the plurality of upstanding walls being joined at corners and forming an upper edge of the body. The container further comprises a bail handle pivotally connected to the body, and a lid a pivotal connection to the body for movement between an open position and a closed position, the lid engaging the upper edge of the body when in the closed position. The container further comprises a telescoping assembly having a first telescoping arm, a second telescoping arm, and a handle extending between the first and second telescoping arms. The telescoping assembly is movable between a first retracted position and a second extended position and is located adjacent one of the plurality of upstanding walls. The container may also comprise first and second roller wheels disposed adjacent to the telescoping assembly wherein the roller wheels pivot about an axis extending between the first and second roller wheels.

According to some optional embodiments, the following features may be used independently with the insulating container, or may be used in combination with other features and the insulating container. the telescoping assembly may further comprise a lower anchor, an upper anchor and a housing extending between the lower and upper anchors. The lower anchor may comprise first and second lower anchors. The upper anchor may comprise first and second upper anchors. The housing may be a first housing and a second housing. The first and second housings may provide a respective nest for a first telescoping segment and a second telescoping segment. The insulated container may further comprise at least one latch on an exterior to retain the lid in the closed position. The insulated container may further comprise a rib depending from an undersurface of the lid. The rib may have at least one catch. The insulated container may further comprise at least one opposing catch at an upper end of at least one of the plurality of upstanding walls or a liner, the opposing catch disposed opposite the at least one catch. The catch and the opposing catch may engage one another to retain the lid in the closed position. The insulated container may further comprise a handlift recess disposed on a front surface of the lid. The insulated container further comprising at least one cup holder formed in the lid. The lid may comprise a relief adjacent to the handle to inhibit interference with the handle when the lid opens. The bail handle being rotatable from a front of the body, over the lid, and to a rear of the body.

According to some embodiments, an insulating container, comprises a body having a lower support having a periphery, a plurality of upstanding walls extending from the periphery of the lower support, the plurality of upstanding walls being joined at corners and forming an upper edge of the body. The insulating container comprises a bail handle pivotally connected to the body and a lid having a pivotal connection to the body for movement between an open position and a closed position, the lid engaging the upper edge of the body when in the closed position. A telescoping handle assembly having a first telescoping arm, a second telescoping arm, and a handle extending between the first and second telescoping arms, the telescoping handle assembly movable between a first retracted position and a second extended position. The telescoping handle assembly includes at least one anchor which engages a groove in the body. First and second roller wheels are disposed adjacent to the telescoping handle assembly, and are connected by an axle which is disposed in the groove.

According to some optional embodiments, the following features may be used independently with the insulating container, or may be used in combination with other features and the insulating container. Each of the first and second telescoping arm may comprise a plurality of segments wherein one of the plurality of segments is a housing. The at least one anchor may comprise comprising a finger that extends into the groove and captures the axle therein. The at least one anchor may be a lower anchor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an insulated container will now be described by way of examples. These embodiments are not to limit the scope of the claims as other embodiments of an insulated container will become apparent to one having ordinary skill in the art upon reading the instant description. Non-limiting examples of the present embodiments are shown in figures wherein:

DETAILED DESCRIPTION

It is to be understood that an insulated container is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

The terms "top," "bottom," "front," "back," "side," "rear," "upward," "downward," and the like may be used in this specification to describe various example features and elements, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of these disclosures.

Referring now to the embodiments of FIGS. 1-9, various views are shown of embodiments of a container, for example an insulated container. The insulated container provides the ability to transport by carrying and by rolling, so that the container may be portable by a single person even when heavily loaded.

Figure 1:
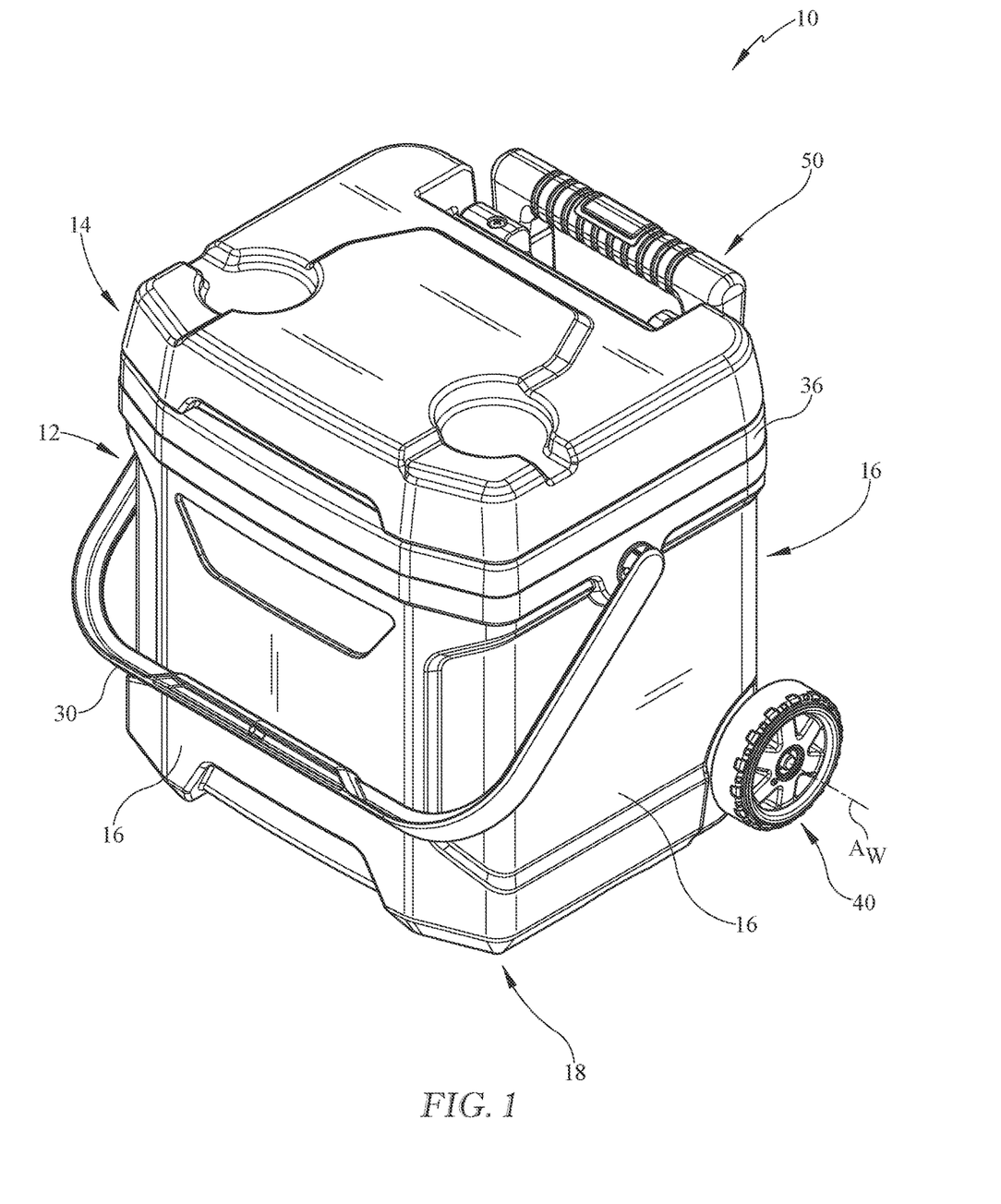
FIG. 1 is a perspective view of an example, non-limiting container in a closed position.

Referring now to FIG. 1, a perspective view of the container 10 is provided. The container 10 may take various forms and in some embodiments may be an insulated container 10, also commonly referred to as a cooler. The container 10 comprises a body 12 and a lid 14. The body 12 and the lid 14 may be pivotally connected in order to provide access to an interior of the container 10 by opening the lid 14. In some embodiments, the body may have one or more mounts 28 to provide a connection location for the lid. However, other structural arrangement may be utilized such as an aperture and pin arrangement which interlock the lid 14 and body 12. The body 12 and lid 14 may be directly connected or may be indirectly connected by one or more additional parts.

Figure 2:
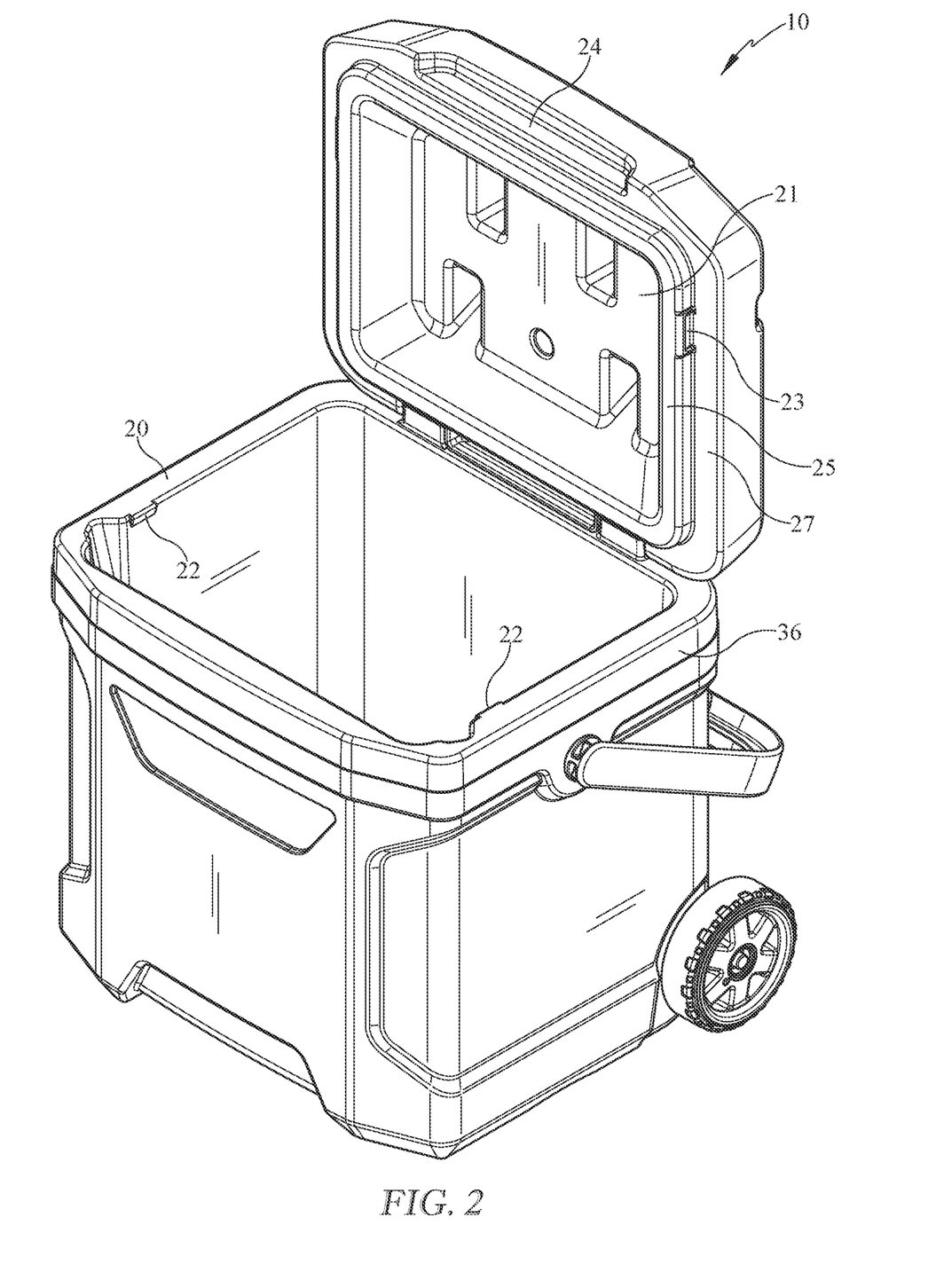
FIG. 2 is a perspective view of an example, non-limiting container in an open position.

The lid 14 may be disposed in two positions. In the depicted embodiment, the lid 14 is shown in the closed position, but as shown in FIG. 2, the lid 14 may also be disposed in an open position. The lid 14 may have an upper surface which is flat, textured, or may also have some functional structure therein such as cupholders as shown. The lid 14 may also have an undersurface as seen in FIG. 2 with some clearance area formed for items that extend upwardly beyond the container body 12.

The body 12 comprises a plurality of upstanding walls 16 which extend from a lower support 18. The lower support 18 defines an internal floor of the container 10 and also provides support for the container 10 against the ground or other substrate. The lower support 18 defines a periphery from which the plurality of upstanding walls 16 extend. The plurality of upstanding walls 16 may be vertical or may be angled extending upwardly from the lower support 18. The plurality of upstanding walls 16 may be linear, curved, curvilinear or other shapes to provide a desired shape of the container 10.

Figure 8:
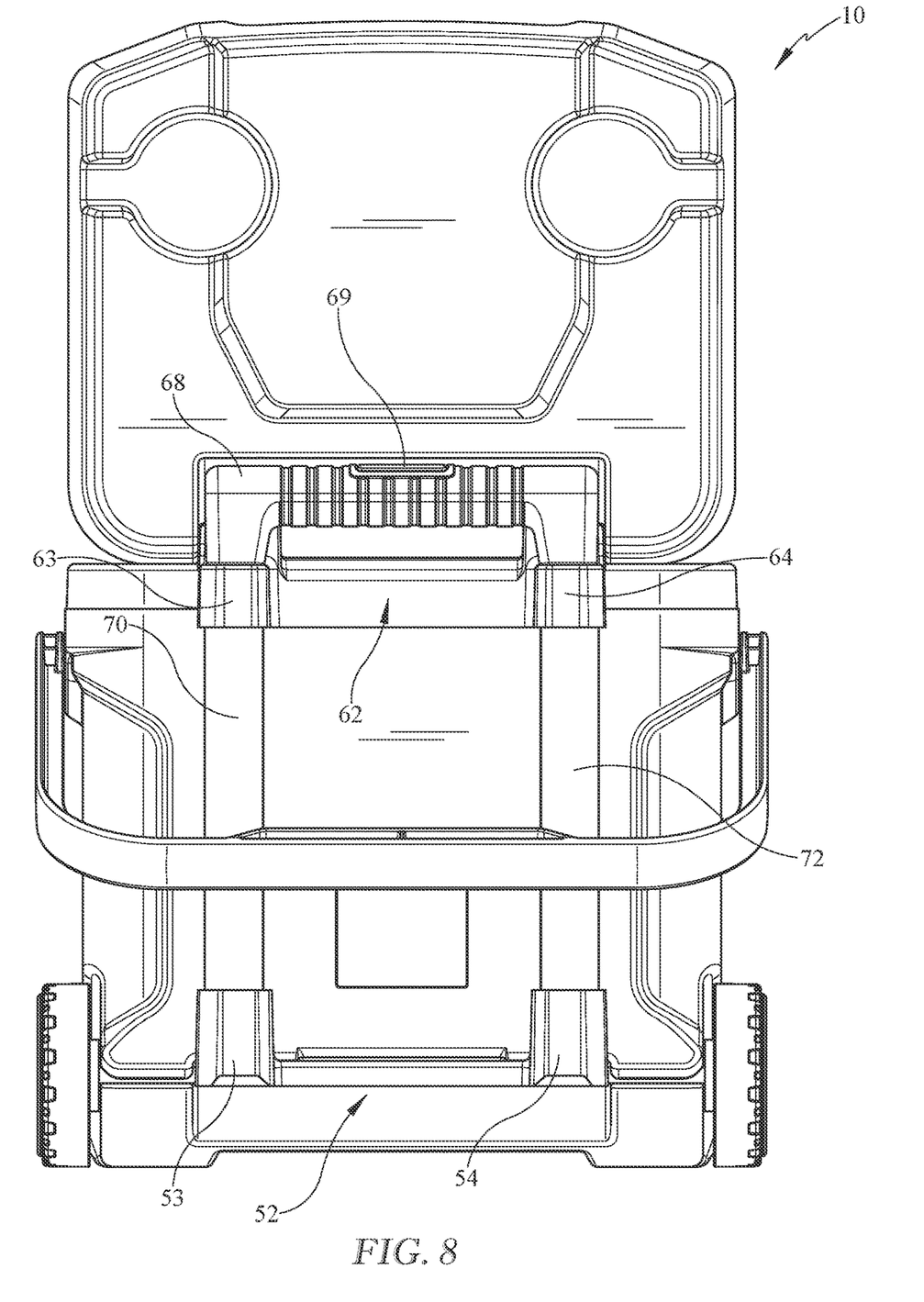
FIG. 8 is a rear elevation view of the container in an open position.

The container 10 may be moved by carrying or by being rolled. In one manner of portability, the body 12 comprises a bail handle 30 which is pivotally connected to the body 12 and allows carrying of the container 10. The bail handle 30 is generally U-shaped and is pivotally connected at ends of the bail handle 30 to the container 10. In the depicted embodiment, the bail handle 30 is shown pivoted toward a front or forward side of the container 10. However, the bail handle 30 may also be pivoted rearwardly as shown in FIG. 8. The bail handle 30 allows for carrying the container 10 by a single person if the container 10 is lightweight or empty and it is more desirable to carry than roll. However, the container 10 may also be carried by two people as well if desired, with the bail handle 30.

The ends of the U-shaped bail handle 30 may be installed to pivot relative to the body 12 in a variety of ways. The ends may have male components that are pivotally secure within female portions of the body 12, or alternatively, the male and female attachment mechanisms may be reversed. The bail handle 30 and the body 12 may have a locking engagement so that the handle 30 is retained in the body 12.

The bail handle 30 may rotate freely through a range of motion. For example, the bail handle 30 may rotate from engagement at the front surface of the body 12 to the rear surface or the telescoping handle assembly 50. Additionally, the range of motion may also comprise a plurality of stops. For example, the bail handle 30 may have a plurality of stops, to retain the handle 30 in preselected positions. In some examples, the handle 30 may include stops at 0 degrees (horizontal), 90 degrees (vertical) and 180 degrees (horizontal). However, stops at other positions may also be utilized.

In an alternate manner of portability, the container 10 may also be moved by roller wheels 40 pivotally connected to the body 12. The wheels 40 each pivot about a wheel axis $A_W$. The axis AW may be defined by one or more axles 42 (FIG. 5) that extend from the body 12 and upon which the roller wheels 40 mount.

In order to roll the container 10 on the roller wheels 40, the container 10 is pivoted and rearwardly with the front edge of the container 10 lift upwardly. When this is done the weight of the container 10 is supported by the roller wheels. The telescoping handle assembly 50 is used to move the container 10 on the roller wheels 40. The telescoping handle assembly 50 has a handle 68 (FIG. 3) that is shown in a stowed position but may be moved to an extended position for moving and controlling the container 10.

The body 12 and lid 14 may be formed in a variety of ways. As noted, the container 10 may in some embodiments be an insulating container. Accordingly, the structure may be formed to increase thermal resistance. In some examples for example, the lid 14 may be formed of high density polyethylene (HDPE) and for example may be blow molded. However alternate embodiments may comprise an injection molded polypropylene or alternatively the lid 14 may be rotomolded. Interior to the upper surface and an inner surface of the lid 14, a foam insulation may be utilized if desired. For example, in some embodiments, a polyurethane foam. In sum, various materials may be used to form the body 12, the lid 14, a liner 36 and interior insulating materials. As a whole, the insulating container 10 or any of its elements, may be molded from polyethylene. In another example, the insulating container 10, or any of its elements, may be molded from polyurethane. In some embodiments, all elements of insulating container 10 may be molded from the same type of polymer. In other embodiments, different elements of the insulating container 10 may be molded from different polymers.

The body 12 may also be formed of high density polyethylene (HDPE) in a blow molding process for example. However other embodiments include injection molded polypropylene or rotomolded processes.

Referring now to FIG. 2, the container 10 is shown with the lid 14 in an open position. With the lid 14 pivoted up, the interior of the body 12 is shown. The upper ends of the plurality of upstanding walls 16 define an upper edge 20 and an opening into the body 12 wherein food, beverage, or other contents may be stored. The lid 14 is shown with a rib 25 depending from a lower surface 27 near a peripheral edge of the lid 14. The rib 25 is sized to fit within an opening of the body 12, and may engage frictionally to inhibit inadvertent opening of the cooler 10.

The lid 14 may be retained closed in a variety of ways. For example in the depicted embodiment, the rib 25 may include a catch 23 and the body 12 or liner 36 may have an opposing catch 22. The catch 23 and the opposing catch 22 may engage one another when closed to retain the lid 14 in a closed position. In the depicted structure, the catch 22 of the body 12 extends horizontally inwardly from the upper edge 20. The catch 22 of the body 12 tapers downwards to the inner surface of the container body 12 or the liner 36. Likewise, the rib 25 on the lid 14 may include a catch 23 which has a recess in which the catch 22 of the container body 12 is disposed. Accordingly, the lid 14 may require an upward force to overcome the engagement of the catches 22, 23 and further open.

In further embodiments, other structures may be used to retain the lid 14 in a closed position. For example, one or more latches (not shown) may be used, or alternatively, a latch and catch either of which may be external structures. Other structures may be used and these are merely examples. However, whereas this may require extra parts and therefore additional manufacturing resources, the catches 22, 23 shown in the FIG. 2 may be formed integrally with the container body 12. As a result, the structure is easily formed and function provided without requiring additional parts and manufacturing problems.

Also shown within the figure, the lid 14 may have a height, with a raised inner surface (ceiling) 21 on the inside of the lid 14. The raised inner surface 21 may provide additional storage capacity for items that extend beyond the upper edge 20 of the container body 12.

The body 12 may also comprise an inner liner 36 which defines an inner surface of the body 12. The liner 36 in some examples may be formed of polypropylene and may be sized to create a space between the liner 36 and the inside surface of each of the plurality of walls 16. Accordingly, a foam adhesive may be disposed between the liner 36 and the inner surface of the plurality of walls 16. In some embodiments, the foam may be formed of polyurethane, for non-limiting example. In some embodiments, wherein the body 12 is rotomolded, the liner and walls may be formed as a single part rather than independently.

Further, with reference to FIGS. 1 and 2, the front surface of the lid 14 may also aid in opening the lid 14. A handlift 24 is provided in the lid 14. The handlift 24 may be external from the lid 14 or may be formed internally as a recess, for example. The handlift 24 is shown as recessed and allows for insertion of a user's fingers to grasp and lift the lid 14. The recess 24 may be formed along the front surface of the lid 14, or along side surfaces, or some combination. Alternatively, the recess may be formed in the body 12 to create a space for a user's hand to grasp an edge of the lid 14.

Figure 3:
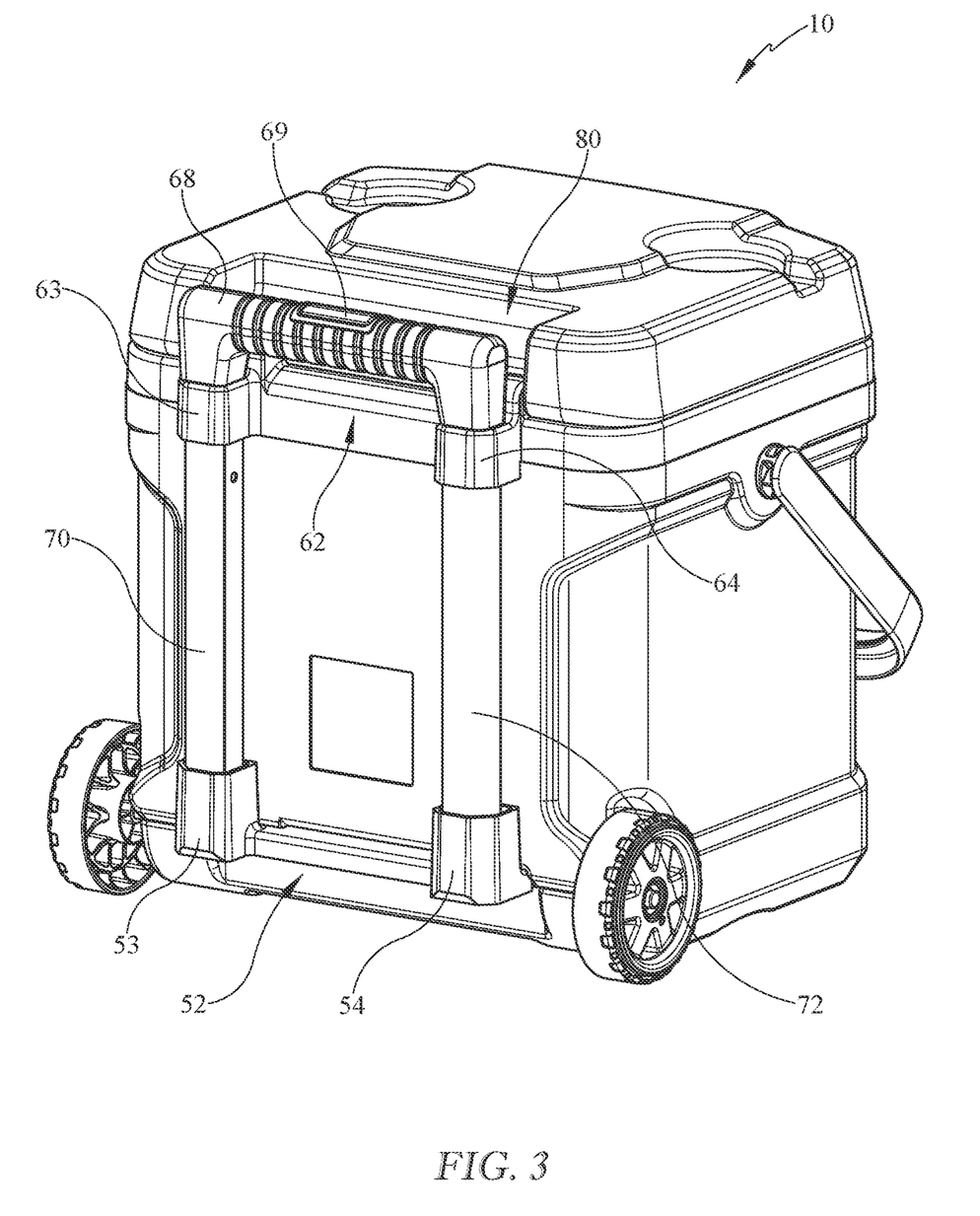
FIG. 3 is a rear perspective view of an example, non-limiting container more clearly depicting an example, non-limiting telescoping handle assembly.

Referring now to FIG. 3, a rear perspective view of the container 10 is depicted. The container 10 comprises the telescoping handle assembly 50. In some embodiments, the roller wheels 40 are disposed toward the rear of the cooler 10. Additionally, the telescoping handle assembly 50 is shown extending from the rear side of the container 10. The telescoping handle assembly 50 comprises an upper anchor 62, a lower anchor 52, and a housing 70. In the depicted embodiment, the upper anchor 62 comprises a first and second upper anchor 63, 64. The lower anchor 52 comprises a first lower anchor 53 and second lower anchor 54. The housing 70 comprises a first housing 70 and a second housing 72, each of which extend respectively between the first upper anchor 63 and the first lower anchor 53, and the second upper anchor 64 and the second lower anchor 54.

Each of the first and second housings 70, 72 provides a nest for telescoping segments 73. The segments 73 may be one or more segments disposed within the housings 70, 72.

At an upper end of the segments 73, the first and second arms are joined by a second handle 68 extending therebetween. The handle 68 may have a release button 69 to disengage one or more locks within the telescoping arms 73. The release button 69 allows disengagement of the locks, but when released, the arms 73 may lock in one or more specific positions until released again. Additionally, however, a non-locking telescoping handle may be utilized for example which may include detents that may be overcome by providing an amount of force to overcome the detent. The detents for example may be engaged when fully extended and may be disengaged by force to overcome detent in order to collapse the handle assembly 50.

Additionally, in the rear perspective view of FIG. 3, a relief 80 is also shown along the rear of the lid 14. The relief 80 provides a space for the lid 14 to clear the second handle 68 of the telescoping assembly 50. When the lid 14 is opened, the relief 80 inhibits engagement of the lid 14 with the handle 68, and allows the lid 14 to stay open and inhibits unintentional closing of the lid 14. The relief 80 may be various sizes and may be dependent upon the size and shape of the adjacent handle 68.

Figure 4:
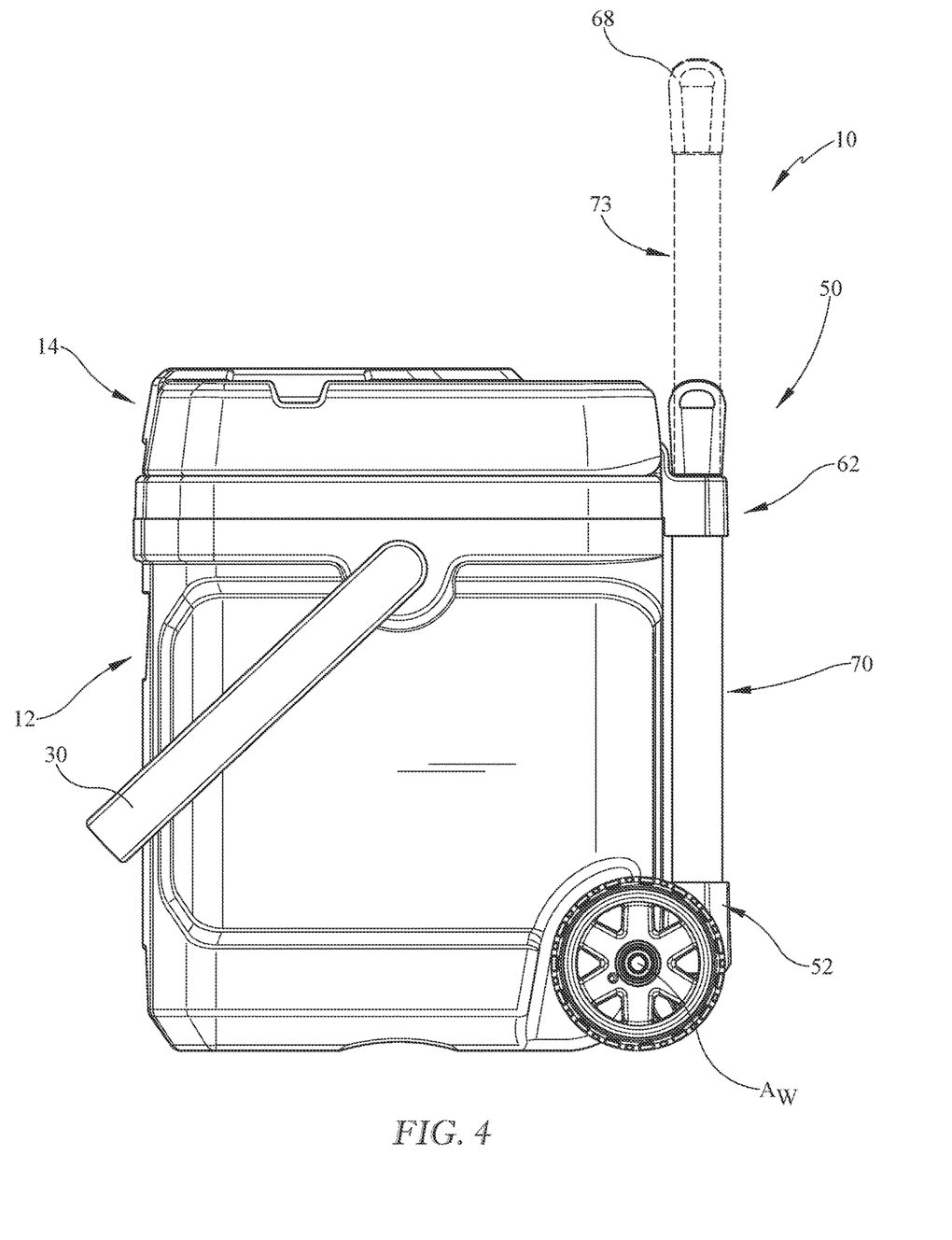
FIG. 4 is a side elevation view of the container in the closed position.

With reference now to FIG. 4, a side elevation view of the container 10 is shown. The view shows the telescoping handle assembly 50 extending from the rear of the container body 12. The lower anchor 52 is located rearward of the wheels 40 so that when the telescoping handle assembly 50 is extended, the container 10 can be tilted on the roller wheels 40, so that the container 10 can be moved in such manner.

Also shown in FIG. 4, the upper anchor 62 is also shown extending from the container 10. The upper anchor 62 is connected to the upper end of the body 12. The upper anchor 62 may comprise an opening in a vertical orientation, and the lower anchor 52 may comprise an opening in a vertical orientation. With the two openings facing one another, the housing 70 may be seated within each opening and the upper and lower anchors 62, 52 capture the housing therein 70. The housing 70 may be formed with a length that is greater than the height between the upper anchor 62 and the lower anchor 52.

The housing 70 is shown and defines one of a plurality of telescoping segments. For example at least one additional segment 73 is shown in broken line extending from the housing 70. The segments are joined by the handle or grip 68.

The combination of the bail handle 30 telescoping handle assembly 50 provides some added function and advantages. The telescoping handle assembly 50 provides some extendable grip 68 that allow for one-handed operation of the cooler 10, even when heavily loaded. Further, the telescoping handle assembly allows for easy operation of the cooler or container 10 into, for example, stadiums for easy carry to a venue having for example stadium seating. Further however, where it may be difficult to use the wheeled functionality along steps for example once in the stadium, the bail handle 30 also allows the user to carry the container 10 at the user's side, so as not to inhibit vision while ascending or descending steps or other obstacles. Still further, the retractability of the telescoping handle also allows the user to reduce the footprint needed once seated at the event.

Figure 5:
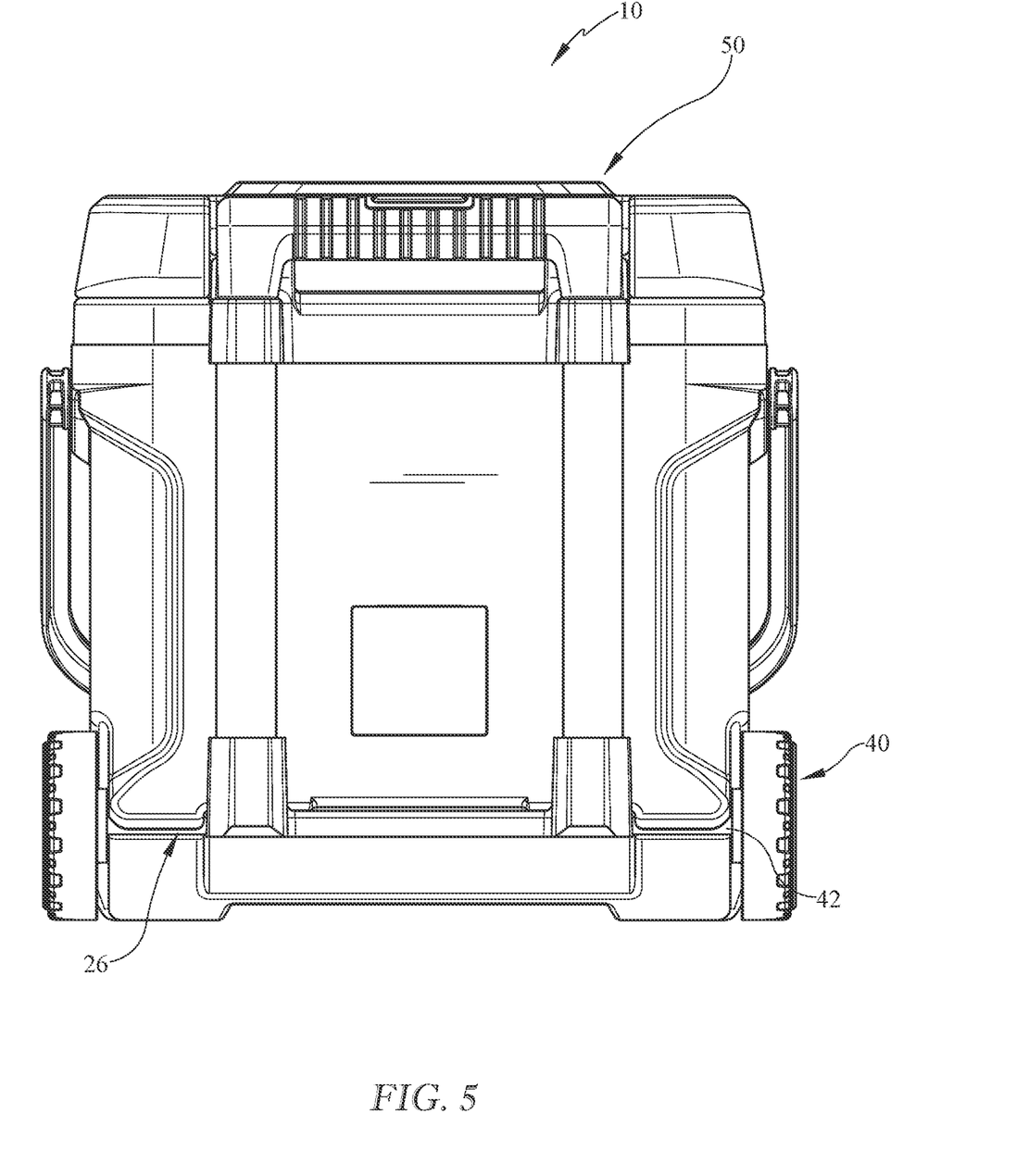
FIG. 5 is a rear elevation view of the container in the closed position.

With reference to FIG. 5, a rear view of the container 10 is shown. The rear view shows a structure related to assembly of the container 10. The container body 12 has an axial groove 26 wherein an axle 42 may be located. The axle 42 may be one axle or may be defined by an axle corresponding to each roller wheel 40. The groove 26 may have an opening such that the axle 42 may be snapped into the groove 26 from a rear to front direction of movement of the axle 42. Alternatively, the one or more axles 42 may be inserted into the groove 26 in an axial direction.

Figure 6:
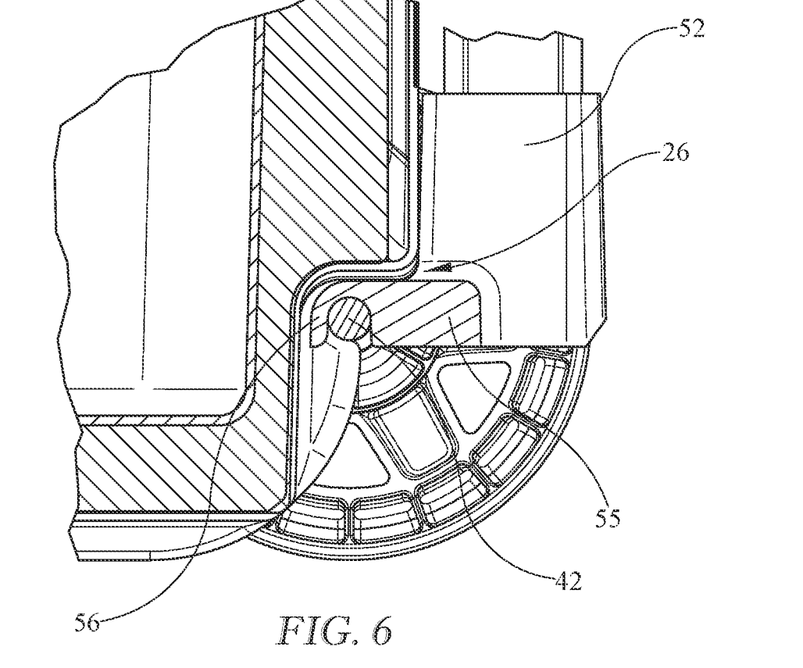
FIG. 6 is a detail section view of a connection of the body and a lower anchor to the body.

Referring additionally to FIG. 6, a section view of the axle 42 and body 12 through the groove 26. The groove 26 may be sized also accommodate a portion of the lower telescoping handle assembly 50. In the section view, an arm 55 extends from the lower anchor 52 toward the groove 26 and a finger 56 extends from the arm 55 into the groove 26. The finger 56 may be extruded in the axial direction although it is not visible in this view. In the depicted embodiment, the finger 56 is shown extending into the groove 26 and about the axle 42. When the axle 42 is positioned in the groove 26, the finger 56 is retained therein.

During installation, the finger 56 may be inserted into the groove 26 in a horizontal orientation and direction. When this is done, the housing 70 is oriented horizontally. Further, the inserted finger 56 may be rotated about the axial axis $A_W$ of the axle 42 and groove 26 so that the housing is disposed in the upright position shown.

Figure 7:
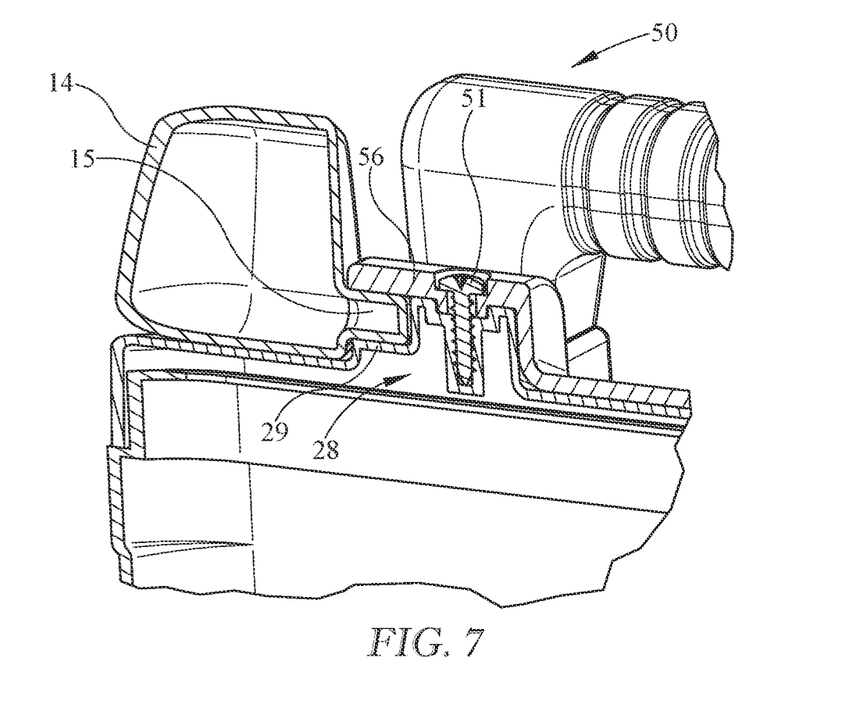
FIG. 7 is a detail section view of a connection of the body and an upper anchor to the body.

As the telescoping handle assembly 50 is rotated upwardly, the upper anchor 62 can next be connected to the body 12. With reference to FIG. 7, a section view of the upper end of the container 10 is shown. The upper end of the body 12 has a mount 28. The finger 56 of the upper anchor 62 is positioned over the mount 28 and may be fastened thereto, for example by fastener 51. In some embodiments, the container 10 may comprise two mounts 28 which correspond to two connection points of the upper anchors 62. The embodiment could comprise one or more mounts and one or more fingers which provide a connection location for the one or more upper anchors.

Also shown in the section view is a view of the hinged connection of the lid 14. The lid 14 is shown having a hinge pin 15 that extends into a hinge opening defined by one or more of the mount 28, the finger 56, or combination. In the depicted embodiment, the mount 28 is stepped. The pin 15 extends into the finger 56 and engages the lower step 29 of the mount 28, and is bound on the upper side of the hinge pin 15 by the finger 56. In the instant depiction, two pins are utilized. However, in the present embodiment a single hinge pin may extend between the one or more mounts, or multiple short hinge pins may be utilized with multiple mounts.

Referring now to FIG. 8, a rear view of an embodiment of the container 10 is depicted. The bail handle 30 is disposed rearwardly from the forward position previously described.

Additionally, the lid 14 is lifted to the open position. The lid 14 includes the relief 80 which clears a space for the handle 68 of the telescoping handle assembly 50. The relief 80 allows the lid 14 to open past 90 degrees (vertical) so that the lid 14 will stay open without needing to be held open. Of course, the lid 14 can be pivoted closed once the contents have been accessed.

Figure 9:
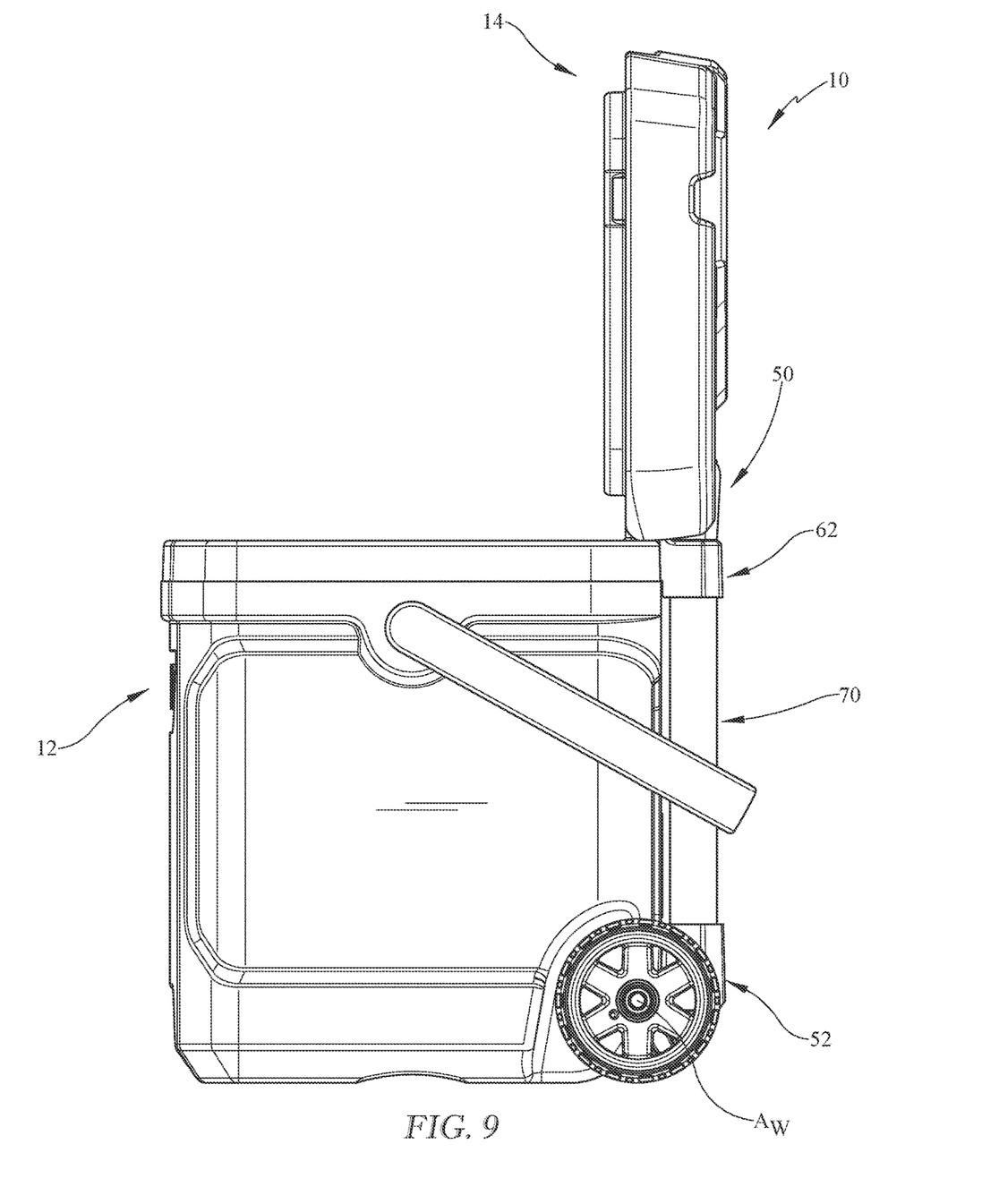
FIG. 9 is a side elevation view of the container in an open position.

With additional reference to FIG. 9, the lid 14 is shown in the upright position. The handle 68 of the telescoping handle assembly 50 is mostly hidden due to the relief 80 in the lid 14.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An insulated container, comprising:
a body having:
  a lower support having a periphery;
  a plurality of upstanding walls extending from said periphery of said lower support;
  said plurality of upstanding walls being joined at corners and forming an upper edge of said body and an opening at said upper edge;
a rigid bail handle pivotally connected to said body;
a lid which covers said opening of said body, said lid having:
  a pivotal connection to said body for movement of said lid between an open position and a closed position;
  said lid engaging said upper edge of said body when in said closed position;

an upper portion of said lid having a relief;
a telescoping assembly having a first telescoping arm, a second telescoping arm, and a handle extending between the first and second telescoping arms;
said telescoping assembly movable between a first retracted position and a second extended position;
said telescoping assembly located adjacent to one upstanding wall of said plurality of upstanding walls;
said telescoping assembly comprising an upper anchor which is fastened to said body to capture said lid for pivotal movement;
first and second roller wheels disposed adjacent to said telescoping assembly wherein said roller wheels pivot about an axis extending between said first and second roller wheels.

2. The insulated container of claim 1, said telescoping assembly further comprising a lower anchor, said upper anchor and a housing extending between said lower and upper anchors.

3. The insulated container of claim 2, said lower anchor comprising first and second lower anchors.

4. The insulated container of claim 3, said upper anchor comprising first and second upper anchors.

5. The insulated container of claim 4, said housing being a first housing and a second housing.

6. The insulated container of claim 5, said first and second housings providing a respective nest for a first telescoping segment and a second telescoping segment.

7. The insulated container of claim 1 further comprising a rib depending from an undersurface of said lid.

8. The insulated container of claim 7, said rib having at least one catch.

9. The insulated container of claim 8, further comprising an opposing catch at an upper end of a liner, said opposing catch disposed opposite said at least one catch.

10. The insulated container of claim 9 wherein said at least one catch and said opposing catch engage to retain said lid in said closed position.

11. The insulated container of claim 1, further comprising a handlift recess disposed on a front surface of said lid.

12. The insulated container of claim 1, further comprising at least one cup holder formed in said lid.

13. The insulated container of claim 1, said rigid bail handle being rotatable from a front of the body, over the lid, and to a rear of the body.

14. An insulating container, comprising:
a body having:
 a lower support having a periphery;
 a plurality of upstanding walls extending from said periphery of said lower support;
 said plurality of upstanding walls being joined at corners and forming an upper edge of said body;
 a rigid bail handle pivotally connected to said body;
a lid having:
 a pivotal connection to said body for movement between an open position and a closed position;
 said lid engaging said upper edge of said body when in said closed position;
 a telescoping handle assembly having a first telescoping arm, a second telescoping arm, and a handle extending between the first and second telescoping arms, said telescoping handle assembly movable between a first retracted position and a second extended position;
 said telescoping handle assembly including at least one lower anchor which engages a groove in said body;
 first and second roller wheels disposed adjacent to said telescoping handle assembly, and being connected by an axle which is disposed in said groove;
 an upper anchor which receives a pin to define said pivotal connection between said lid and said body.

15. The insulating container of claim 14, further wherein each of said first and second telescoping arms comprises a plurality of segments wherein one of said plurality of segments is a housing.

16. The insulating container of claim 14, said at least one lower anchor comprising a finger that extends into said groove and captures said axle therein.

* * * * *